United States Patent Office 3,692,674
Patented Sept. 19, 1972

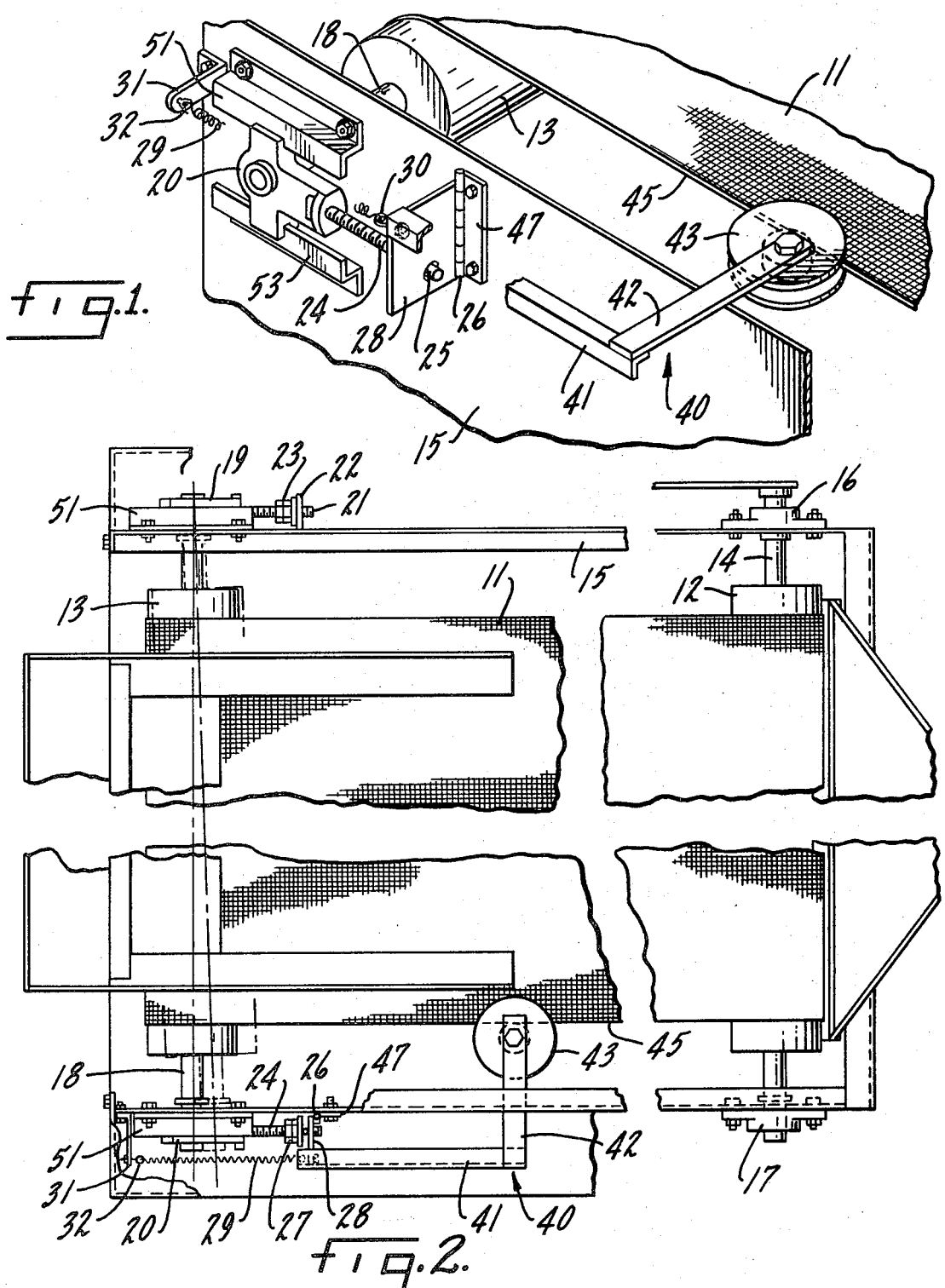

3,692,674
FILTER SCREEN TRAINING MECHANISM
Marvin E. Wood, Lenexa, Kans., assignor to
Ecodyne Corporation
Filed Nov. 4, 1970, Ser. No. 86,820
Int. Cl. B01d 33/14
U.S. Cl. 210—401
4 Claims

ABSTRACT OF THE DISCLOSURE

An improved belt training mechanism having an endless belt maintained under tension between a pair of rollers, by means of which one of the rollers over which the filter screen travels may be skewed, to correct the alignment of the belt. The invention includes a single guide means to feel the movement of an edge of the filter screen and align the belt accordingly. Spring means are provided to reduce the force applied to the edge of the belt by the guide means.

BACKGROUND OF THE INVENTION

This invention relates to an improved belt training mechanism in combination with a belt system for maintaining an endless belt in proper alignment with the rollers over which the belt travels, and more particularly pertains to a self adjusting means for training the endless filter screen of a sludge concentrator so as to prevent it from running off the ends of the rollers.

The present invention is an improvement in sludge concentrators, of the type disclosed in U.S. Pat. No. 3,531,404, assigned to the assignee of the present invention. The sludge concentrator includes a primary endless filter screen which receives flocculated sludge such that sludge is retained thereon as water drains through the screen. The screen comprises a belt-type conveyor supported at its ends by a pair of rollers, and may be additionally supported at its mid-point by a middle roller. This invention deals specifically with solving the problem of preventing the endless filter screen from running off the ends of the rollers. This problem exists because the filter screen of a sludge concentrator is particularly susceptible to stretching due to the frequent wetting and drying of the screen media and chemical action that may occur between the sludge and the screen media.

Endless filter screens, or other types of endless flexible belts, running on rollers, have a tendency to run off the end of the rollers. If the rollers are slightly non-parallel or the screen is not uniform, this will cause the screen to be stretched more in one area than another. This unequal stretching of the filter screen will cause the screen to move in one direction or the other. If the flexible screen does not achieve a position where the forces are in balance, it will run off one end of the roller. To eliminate this, it is necessary to continually align the rollers to equalize the tension in the screen and reach an equilibrium alignment state. Also, as the filter screen wears or the tension of the screen media is effected by humidity or chemicals, the tension of the screen will vary from area to area. This necessitates that a training device be self adjusting to compensate for change in tension of the filter screen media.

Attempts to solve the problem of training filter screens, or other type flexible belts, have heretofore involved restraining the edges of the screen or belt. This method has the disadvantage that it causes excessive wear on the edge of the filter screen, or other type flexible belt, and is not self-adjusting to compensate for change in belt length and tension due to wear, humidity or chemical action.

This problem has also been dealt with in the past in the conveyor belt art by providing a belt training system in which one of the rollers of the system is supported by means permitting a limited movement of the roller shaft or axle. An example of such a training mechanism is disclosed in U.S. Pat. No. 2,914,957. This particular training system, and others similar thereto, are very complex and therefore rather costly.

SUMMARY OF THE INVENTION

The primary object of the present invention is to provide an improved belt trainer which is capable of maintaining the alignment of endless belts, and more particularly endless filter screens, of the type used in a sludge concentrator with little or no damage to the edges of these screens or belts.

Another object is to provide a self-adjusting training mechanism for an endless belt or filter screen which prevents them from running off the ends of the rollers.

A further object is to provide a belt training mechanism which compensates for the change in filter screen length and tension due to wear, humidity and chemical action.

A still further object is to provide a belt training mechanism that is not complicated or bulky, is inexpensive to manufacture and requires limited maintenance.

Other objects and advantages of this invention will be apparent from the drawings, specification, and claims.

This invention provides an improved belt training mechanism, in combination with a sludge concentrator, having an endless filter screen maintained under tension between a pair of rollers, by means of which one of the rollers over which the filter screen travels may be skewed, to correct the alignment of the filter screen. Briefly stated, the invention includes a guide means to feel the movement of an edge of the filter screen and align the roller accordingly. The guide means includes a lever arm having a guide roller associated with one end and the other end being pivotable about a substantially vertical axis. The guide roller is positioned adjacent the edge of the filter screen so that movement of the filter screen against the guide roller rotates the lever arm about a vertical axis. This rotational movement of the lever arm is transmitted to the roller shaft to skew the roller and thereby move the filter screen in the opposite direction. Spring means are provided to reduce the force applied to the edge of the filter screen by the guide roller. As a result of this movement of the roller, the filter screen will have a tendency to reach an equilibrium position. As the filter screen wears or stretches due to humidity or chemical action, the training mechanism will adjust automatically to keep the filter screen in this equilibrium position.

DESCRIPTION OF THE DRAWINGS

The foregoing objects of the invention will be apparent from the following description and the accompanying drawings, wherein:

FIG. 1 is a perspective view of the filter screen training mechanism embodying the present invention, fragments of a filter screen and a portion of a sludge concentrator frame being shown; and FIG. 2 is a plan view of the primary filter screen portion of a sludge concentrator including the training mechanism of the present invention.

DESCRIPTION OF THE PREFERRED EMBODIMENT

Referring to FIG. 2, the primary endless filter screen portion of a sludge concentrator, of the type disclosed in U.S. Pat. No. 3,531,404, is shown having a filter screen 11 tensioned between a pair of belt support rollers 12 and 13.

Filter screen 11 is preferably of a woven synthetic fabric, i.e. polyester or nylon, having openings from 250 to 1410 microns. Screen 11 extends around a drive roller 12 having a shaft 14 suitably journaled to frame 15 at bearings 16 and 17 and a driven roller 13 having a shaft 18 suitably journaled to frame 15 at bearings 19 and 20.

Shaft 18 associated with roller 13 is journaled to support bearings 19 and 20 for rotation about a substantially horizontal axis. Bearings 19 and 20 are preferably of the type which permit shaft 18 to become skewed with respect to the belt axis without binding in the bearings. Bearings 19 and 20 are slidably mounted to frame 15. A pair of horizontally disposed angle brackets 51 and 53 secured on each side of frame 15 receive bearings 19 and 20 in a sliding tongue and groove arrangement, as best seen in FIG. 1. Bearings 19 and 20 and roller 13 associated therewith are thus movable towards and away from roller 12.

Bearing 19 is selectively secured in position by a threaded linkage arm 21 affixed at one end to bearing 19 and at its other end passes through an aperture in lug 22 attached to frame 15. Threadedly received about arm 21 is spacer nut 23 positioned between lug 22 and bearing 19 such that nut 23 acts as a stop member preventing bearing 19 from moving towards bearing 16. Since nut 23 is adjustably positioned along arm 21 the minimum distance between bearings 16 and 19 may be selectively set. The tension of screen 11 retains arm 21 in the aperture of lug 22 and retains nut 23 in contact with lug 22.

Bearing 20 has a threaded linkage arm 24 affixed thereto at one end thereof and at its other end passes through aperture 25 in hinge means 26 attached to frame 15. Spacer nut 27 is threadedly received about arm 24 between hinge 26 and bearing 20 such that nut 27 acts as a stop member preventing bearing 20 from towards bearing 17. Hinge 26 includes a plate 47, affixed to frame 15, pivotally connected about a vertical axis to plate 28, which receives arm 24 through aperture 25. The tension of screen 11 retains arm 24 in aperture 25 and retains nut 27 in contact with plate 28.

Tension spring 29 is affixed at one end to lug 30, affixed to plate 28, and at its other end to adjustable eye bolt 32 received by lug 31 affixed to frame 15. Spring 29 tends to bias plate 28 in clockwise direction and thereby biases bearing 20 away from bearing 17 via arm 24 and nut 27. The tension of spring 29 may be adjusted by movemnet of eye bolt 32 towards and away from lug 31.

Guide means 40 includes a first lever arm 41 and a second lever arm 42. Lever arm 41 is affixed at one end substantially perpendicular to plate 28 and at its other end substantially perpendicular to one end of lever arm 42. The other end of lever arm 42 has a guide roller 43 journaled thereto for free rotation about a substantially vertical axis. Guide roller 43 is positioned adjacent edge 45 of screen 11 such that the resultant force created as edge 45 moves against roller 43 pivots plate 28 in a clockwise direction thereby moving bearing 20 further away from bearing 17. The adjustment of nut 23 moves guide roller 43 towards and away from edge 45.

In operation, screen 11 is initially tensioned between rollers 12 and 13 by adjusting nuts 23 and 27 until the desired tension in screen 11 is reached, e.g. 20 lbs. The tension on screen 11 results in a force of approximately 20 lbs. being transmitted through bearing 20, arm 24, plate 28, and levers 41 and 42 tending to push guide roller 43 towards edge 45 of belt 11. To counter balance this force of 20 lbs. on roller 43, spring 29 is tensioned, by adjusting eye bolt 32, to approximately 19 lbs. thereby a resultant force of only approximately 1 lb. biases roller 43 towards edge 45 of screen 11. Roller 12 is then skewed, by minor adjustment to nuts 23 and 27, as shown in phantom lines in FIG. 2, just enough to ensure that screen 11 will initially wander in the direction of guide roller 43.

As edge 45 moves towards roller 43 it exerts a force thereon which when sufficient to exceed the bias of roller 43 and any friction within the mechanism, transmits a force through levers 42 and 41 to pivot plate 28 in a clockwise direction and thereby moves bearing 20 further away from bearing 17 a sufficient distance so as to change the skew of roller 12 and thereby cause screen 11 to wander in the opposite direction. Since roller 43 is biased toward the edge of screen 11, when the force from edge 45 is removed due to the removal of the force exerted on roller 43 by edge 45, the bias on roller 43 will tend to move bearing 20 closer to bearing 17 thereby once again causing edge 45 to exert a force sufficient to move bearing 20 further apart from bearing 17. Eventually an equilibrium point is reached wherein the belt will not wander in either direction and thus not run off either end of the roller 13.

The present invention provides a unique self-adjusting means for training an endless filter screen, or other types of endless flexible belts, to prevent them from running off the end of the rollers. This accomplished without excessive wear on edge 45 of filter screen 11 because of the reduced pressure exerted on edge 45 by guide roller 43 due to the bias of spring 29. Also, as the filter screen wears or stretches due to humidity or chemical action, the training means of the present invention will adjust automatically to keep the filter screen in an equilibrium position.

Various modifications are contemplated and may obviously be resorted to by those skilled in the art without departing from the spirit and scope of the invention, as hereinafter defined by the appended claims, as only a preferred embodiment has been disclosed.

What is claimed is:

1. In combination with a belt support frame, a continuously moving endless belt, comprising:
   (a) a support frame having an endless belt operatively mounted thereon for travel in a selected direction;
   (b) a first roller associated with a first portion of said belt and a second roller associated with a second portion of said belt, said first roller being rotatably secured to said frame, said second roller having a first end rotatably secured in a pivoted relationship to said frame and a second end rotatably secured to a bearing means slidably mounted to said frame so as to permit said second end of said second roller to move in a direction towards and away from said first roller independent of any sliding movement of said first end;
   (c) said belt being tensioned between said first and second rollers so as to bias said second end of said second roller and said bearing means towards said first roller;
   (d) linkage means positioned between said first and second rollers associated with said slidably mounted bearing means so as to translate forces to said bearing means;
   (e) spring means associated with said bearing means to bias said bearing means in a direction away from said first roller and at a slightly less magnitude than the bias from the tension of said belt causing a small resultant bias tending to bias said bearing means towards said first roller;
   (f) a linkage means arm secured at a first end to said sliding bearing means and at a second end to a guide roller journaled for free rotation about a substantially vertical axis; and
   (g) said guide roller having an edge positioned so as to contact an edge of said belt and being biased by said bearing means towards said belt edge such that when a force exerted on the edge of said guide roller by said belt edge moving against said guide roller exceeds the bias on said guide roller said linkage arm moves said slidable bearing means and said second end of said second roller in a direction away from said first roller.

2. The combination defined in claim 1 wherein said linkage means arm is pivotally attached to said frame.

3. The combination defined in claim 2 wherein said linkage means arm being adjustable in length so as to permit said guide roller to be selectively moved towards and away from said edge of said belt.

4. In an apparatus for de-watering sludge in a treatment system, a continuously moving endless filter screen means, comprising:

(a) a support frame having an endless filter screen operatively mounted thereon for travel in a selected direction;

(b) said filter screen being of synthetic woven material having mesh openings in the range of 250 to 1410 microns;

(c) a first roller associated with a first portion of said filter screen and a second roller associated with a second portion of said filter screen, said first roller being rotatably secured to said frame, said second roller having a first end rotatably secured in a pivoted relationship to said frame and a second end rotatably secured to a bearing means slidably mounted to said frame so as to permit said second end of said second roller to move in a direction towards and away from said first roller independent of any movement of said first end;

(d) said filter screen being tensioned between said first and second rollers so as to bias said second end of said second roller and said bearing means towards said first roller;

(e) plate means pivotal about a substantially vertical axis extending outward from said frame;

(f) linkage means positioned between said first and second rollers associated with said bearing means and said plate means so as to translate forces applied to said plate means to said bearing means and forces applied to said bearing means to said plate means;

(g) spring means associated with said bearing means to bias said bearing means in an opposite direction and at a slightly less magnitude than the bias from the tension of said filter screen causing a small resultant bias tending to bias said bearing means towards said first roller;

(h) a lever arm secured at a first end to said plate means and at a second end to a guide roller journaled for free rotation about a substantially vertical axis; and (i) said guide roller being positioned so as to contact an edge of said filter screen and being biased by said bearing means towards said edge such that when a force exerted on said guide roller by said edge moving against said guide roller exceeds the bias on said guide roller said lever arm pivots said plate means so as to move said bearing means and said second end of said second roller in a direction away from said first roller.

References Cited

UNITED STATES PATENTS

| | | | |
|---|---|---|---|
| 2,451,394 | 10/1948 | Klein | 198—202 |
| 2,600,273 | 6/1952 | Seifried | 198—202 UX |
| 2,724,492 | 11/1955 | Kolbe | 198—202 |
| 2,725,757 | 12/1955 | Murphy | 198—202 X |
| 2,783,871 | 3/1957 | Sowards | 198—202 |
| 3,065,646 | 11/1962 | Vance | 198—202 X |
| 3,120,492 | 2/1964 | Peterson | 210—401 |

REUBEN FRIEDMAN, Primary Examiner

T. A. GRANGER, Assistant Examiner